United States Patent
Zhang et al.

(10) Patent No.: US 9,794,391 B2
(45) Date of Patent: Oct. 17, 2017

(54) MOBILE TERMINAL AND PENDANT CONNECTED THEREWITH

(71) Applicant: Xiaomi Inc., Beijing (CN)

(72) Inventors: Lei Zhang, Beijing (CN); Zicheng Liu, Beijing (CN); Zhu Mao, Beijing (CN)

(73) Assignee: Xiaomi Inc., Beijing (CN)

( * ) Notice: Subject to any disclaimer, the term of this patent is extended or adjusted under 35 U.S.C. 154(b) by 84 days.

(21) Appl. No.: 14/139,562

(22) Filed: Dec. 23, 2013

(65) Prior Publication Data

US 2014/0111401 A1    Apr. 24, 2014

Related U.S. Application Data

(63) Continuation of application No. PCT/CN2013/078932, filed on Jul. 5, 2013.

(30) Foreign Application Priority Data

Oct. 10, 2012 (CN) .......................... 2012 1 0383278

(51) Int. Cl.
    *H04M 1/725* (2006.01)
    *H01Q 1/44* (2006.01)
    *H01Q 1/24* (2006.01)
    *H04M 1/21* (2006.01)

(52) U.S. Cl.
    CPC ........ *H04M 1/72527* (2013.01); *H01Q 1/242* (2013.01); *H01Q 1/44* (2013.01); *H04M 1/21* (2013.01); *H04M 2250/04* (2013.01)

(58) Field of Classification Search
    CPC ..... H01Q 1/242; H01Q 1/44; H04M 1/72527; H04M 2250/04; H04M 1/21

USPC ................... 343/702, 718, 904–906
See application file for complete search history.

(56) References Cited

U.S. PATENT DOCUMENTS

| | | | | |
|---|---|---|---|---|
| 5,757,332 | A * | 5/1998 | Hanaoka | H01Q 1/242 343/702 |
| 6,894,647 | B2 * | 5/2005 | Jenwatanavet | H01Q 1/243 343/700 MS |
| 2007/0229366 | A1 * | 10/2007 | Kim | H01Q 1/243 343/700 MS |
| 2008/0287170 | A1 | 11/2008 | Huang et al. | |

FOREIGN PATENT DOCUMENTS

| | | | | |
|---|---|---|---|---|
| CN | 2845195 | | 12/2006 | |
| CN | 101296261 | | 10/2008 | |
| CN | 201282188 | | 7/2009 | |
| CN | 201466210 U | * | 5/2010 | ............... H01Q 1/44 |
| CN | 201478437 U | * | 5/2010 | ............... H01Q 1/22 |

(Continued)

OTHER PUBLICATIONS

European Search Report for Application No. 13845672.8, from the European Patent Office, dated Oct. 29, 2015.

(Continued)

*Primary Examiner* — Peguy Jean Pierre
(74) *Attorney, Agent, or Firm* — Finnegan, Henderson, Farabow, Garrett & Dunner LLP

(57) ABSTRACT

A pendant for use with a mobile terminal, including: a pendant body containing an antenna; and a pendant cord connected with the pendant body, the pendant cord enclosing a cable connected to the antenna for transmitting and receiving radio frequency signals.

8 Claims, 5 Drawing Sheets

(56) References Cited

FOREIGN PATENT DOCUMENTS

| | | |
|---|---|---|
| CN | 201910851 | 7/2011 |
| CN | 201985243 U | 9/2011 |
| CN | 102904991 | 1/2013 |
| CN | 202818421 | 3/2013 |
| EP | 1 993 165 | 11/2008 |
| EP | 2 249432 A1 | 11/2010 |
| GB | 2 382 722 A | 6/2003 |
| JP | 08222927 A | 8/1996 |
| JP | 2005160022 A | 6/2005 |
| JP | 2007103987 A | 4/2007 |
| JP | 2008152677 A | 7/2008 |
| JP | 2008219537 A | 9/2008 |
| KR | 1020120084770 | 7/2012 |
| RU | 2160946 C2 | 12/2000 |
| WO | WO 2008/091083 A1 | 7/2008 |
| WO | WO 2009/005271 A2 | 1/2009 |

OTHER PUBLICATIONS

Office Action for Application No. 10-2014-7035270, from the Korean Intellectual Property Office, dated Oct. 29, 2015.
Office Action for Application No. 2015-516442, from the Japanese Patent Office, dated Feb. 3, 2016.

* cited by examiner

MOBILE TERMINAL AND PENDANT CONNECTED THEREWITH

CROSS REFERENCE TO RELATED APPLICATIONS

This application is a continuation of International Application No. PCT/CN2013/078932, filed Jul. 5, 2013, which is based upon and claims priority of Chinese Patent Application No. 201210383278.2, filed Oct. 10, 2012, the entire contents of which are incorporated herein by reference.

TECHNICAL FIELD

The present disclosure relates generally to wireless communication and, more particularly, to a device including a mobile terminal and a pendant connected therewith.

BACKGROUND

An antenna is essential for a device to perform wireless communication. A variety of antennae can be used to meet different requirements associated with frequencies, applications, situations and the like. Based on a position relation with the device, antennae can be classified as two kinds, i.e., built-in antenna and external antenna.

For a mobile phone, a conventional built-in antenna arrangement is typically achieved by making an internal antenna using a flexible printed circuit board (FPCB), which is attached to the inside of a phone shell and connected to antenna contacts on a circuit board of the mobile phone via brackets or pins, allowing the connection between the antenna and an antenna circuit on the circuit board.

However, in the conventional built-in antenna arrangement, a certain space for antenna contacts is needed to be reserved on the circuit board of the mobile phone, which may cause insufficient remaining space available. As mobile phones have more and more functions, the space shortage problem of the circuit board caused by antenna contacts is considerably rising. Furthermore, the antenna being included inside the phone shell may lead to an increase of a thickness of the mobile phone.

SUMMARY

According to a first aspect of the present disclosure, there is provided a pendant for use with a mobile terminal, comprising: a pendant body containing an antenna; and a pendant cord connected with the pendant body, the pendant cord enclosing a cable connected to the antenna for transmitting and receiving radio frequency signals.

According to a second aspect of the present disclosure, there is provided a device, comprising: a mobile terminal; and a pendant connected to the mobile terminal, wherein the pendant includes a pendant body containing an antenna, and a pendant cord enclosing a cable connected to the antenna for transmitting and receiving radio frequency signals.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
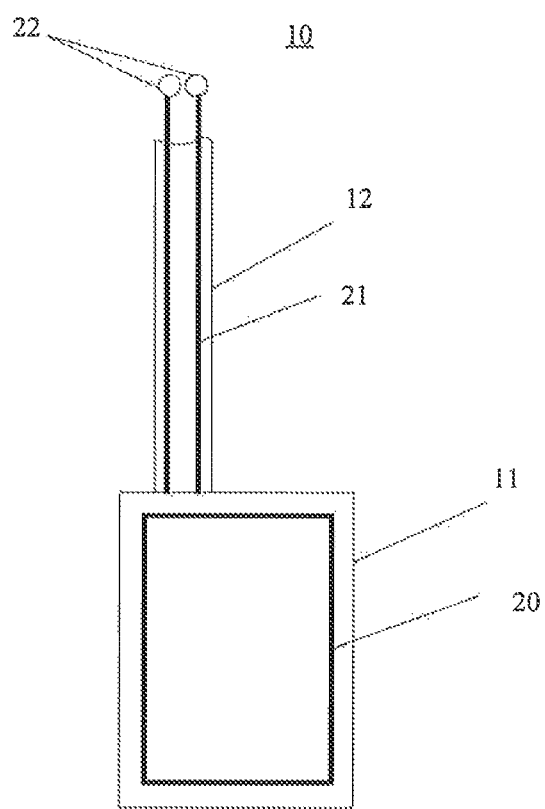
FIG. 1 is a schematic diagram of a pendant for use with a mobile terminal, according to an exemplary embodiment.

FIG. 1 is a schematic diagram of a pendant 10 for use with a mobile terminal, according to an exemplary embodiment. Referring to FIG. 1, the pendant 10 includes a pendant body 11 and a pendant cord 12 connected to the pendant body 11.

In exemplary embodiments, the pendant body 11 is structured to contain an antenna 20, such that the antenna 20 is built into the pendant body 11. The pendant cord 12 is implemented with a hollow cord to enclose one or more cables 21 connected to the antenna 20 for transmitting and receiving radio frequency (RF) signals. In addition, one or more connecting contacts 22 are located at an end of the cables 21 for contact with antenna contacts in the mobile terminal (not shown), such that the antenna 20 built in the pendant body 11 is connected with the mobile terminal.

Figure 2:
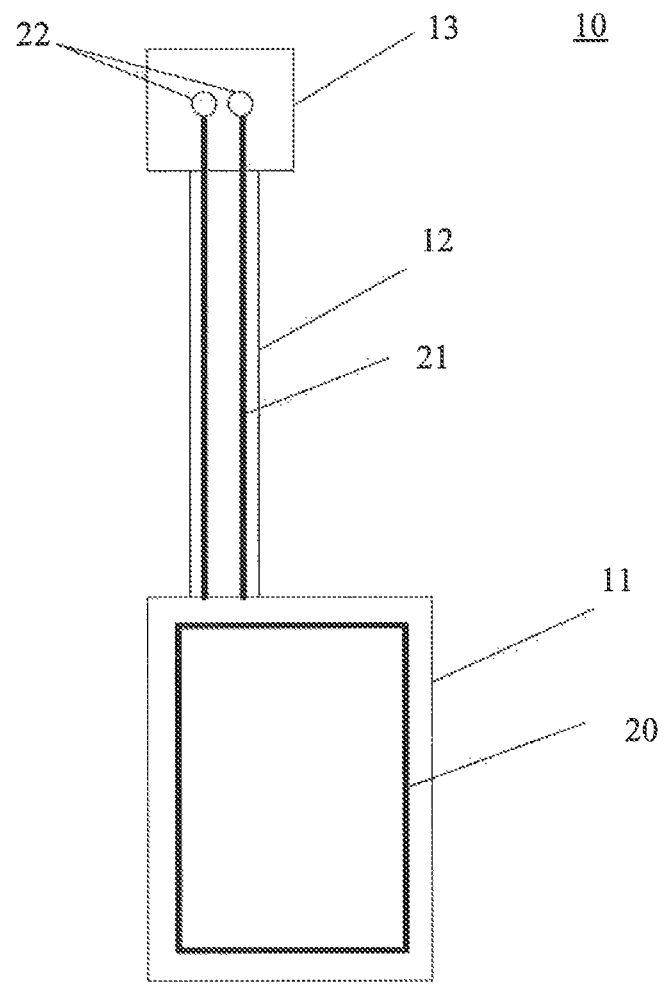
FIG. 2 is a schematic diagram of a pendant for use with a mobile terminal, according to an exemplary embodiment.

With reference to FIG. 2, in exemplary embodiments, the pendant 10 further includes a first connecting component 13. As shown in FIG. 2, the connecting contacts 22 are disposed in the first connecting component 13. Further, the antenna contacts are disposed in a second connecting component (not shown) of the mobile terminal, which can be detachably or non-detachably connected to the first connecting component 13.

In one exemplary embodiment, the second connecting component of the mobile terminal is non-detachably connected to the first connecting component 13 of the pendant 10. For example, the connecting contacts 22 in the first connecting component 13 are connected to the antenna contacts in the second connecting component through soldering. Specifically, the first connecting component 13 can be integral with the second connecting component, and the connecting contacts 22 in the first connecting component 13 can be welded to the antenna contacts in the second connecting component.

In one exemplary embodiment, the second connecting component of the mobile terminal is detachably connected with the first connecting component 13 of the pendant 10. Accordingly, the connecting contacts 22 in the first connecting component 13 will be in contact with the antenna contacts in the second connecting component when the first connecting component 13 is in connection with the second connecting component.

Figure 3:
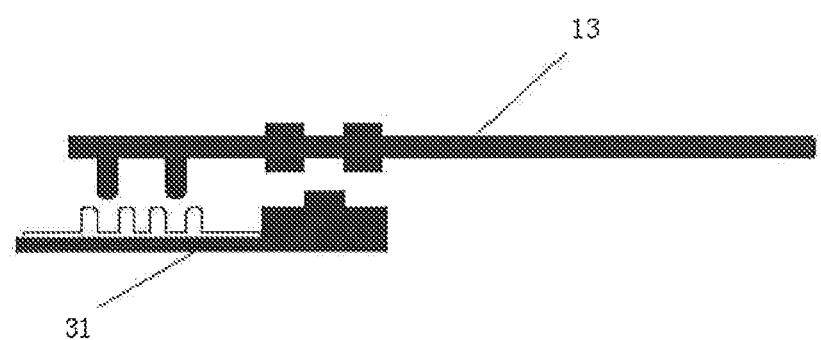
FIG. 3 is a schematic diagram showing an exemplary snap-fit connection between a first connecting component in a mobile terminal and a second connecting component in a pendant, according to an exemplary embodiment.

In exemplary embodiments, the detachable connection between the first connecting component 13 of the pendant 10 and the second connecting component of the mobile terminal may be a snap-fit connection, a threaded connection, or a plug-in connection. For example, FIG. 3 is a schematic diagram showing an exemplary snap-fit connection between the first connecting component 13 of the pendant 10 and the second connecting component, represented by a connecting component 31, of the mobile terminal.

The detachable connection is not specifically limited in the present disclosure, and any means other than the above mentioned detachable connection can be employed.

Referring back to FIG. 2, in exemplary embodiments, the detachable connection can also be achieved by using various data input/output (I/O) interfaces of the mobile terminal, such as an audio I/O interface, a universal serial bus (USB) interface, a firewire (IEEE 1394) interface, or a power interface, as components for connecting the pendant 10 to the mobile terminal. For example, when a data I/O interface of the mobile terminal is used as the second connecting component, and a port corresponding to the data I/O interface is used as the first connecting component 13. The connecting contacts 22 in the first connecting component 13 will be in contact with the antenna contacts in the second connecting component when the first connecting component 13 is in connection with the second connecting component.

In exemplary embodiments, when a data I/O interface of the mobile terminal is used as the second connecting component, the data I/O interface can be dedicatedly used to connect the first connecting component 13, for realizing the connection between the antenna 20 built in the pendant body 11 and the mobile terminal. For example, a USB interface of the mobile terminal, which is dedicatedly used to connect the pendant 10, can serve as the second connecting component, and the first connecting component 13 of the pendant 10 can be a port corresponding to the USB interface.

Alternatively, the data I/O interface is used not only to connect the pendant 10, but also to connect another external unit. For example, the pendant 10 can share the data I/O interface of the mobile terminal with the external unit, and the connection with the data I/O interface can be switched between the pendant 10 and the external unit by using a controller in, e.g., the mobile terminal. For example, the audio I/O interface of the mobile terminal can serve as the second connecting component, and the first connecting component 13 of the pendant 10 can be a port corresponding to the audio I/O interface. The audio I/O interface can be connected to the first connecting component 13 of the pendant 10 as well as a port of an earphone with the connection switched by the controller.

In exemplary embodiments, the antenna 20 is a low frequency antenna. Since the antenna 20 built in the pendant 11 is arranged outside the mobile terminal, the antenna 22 being a low frequency antenna can improve communication quality.

In one exemplary embodiment, the antenna 22 is a near field communication (NFC) antenna, for the mobile terminal to perform wireless communications with another device, such as a contactless smart card, within a certain range. NFC is a short-range low frequency wireless communication technology, allowing a contactless point-to-point data transmission between electronic devices. NFC features high bandwidth, low energy consumption and the like due to its unique signal attenuation model. In addition, NFC is compatible with contactless smart cards and is becoming a formal standard. Furthermore, NFC can allow various devices to securely, rapidly, and automatically communicate with each other by applying a near field connection protocol. Compared to other wireless communication technologies, NFC can be used in private communications within a short range. NFC plays an important role in the field of access control management, bus card identification, mobile payment and the like.

In one exemplary embodiment, the antenna 20 is arranged in the pendant body 11 in a manner of homocentric squares.

In the above illustrated embodiments, the antenna 20 is built in the pendant body 11 of the pendant 10, such that when the pendant 10 is connected to the second connecting component of the terminal through the first connecting component 13, the connecting contacts in the first connecting component 13 are in contact with the antenna contacts in the second connecting component, which implements the connection between the antenna 20 built in the pendant body 11 and the mobile terminal. Thus, due to the built-in arrangement in the pendant 10 that is separated from the mobile terminal, the antenna 20 is disposed outside the mobile terminal, which helps saving space in the mobile terminal.

Figure 4:
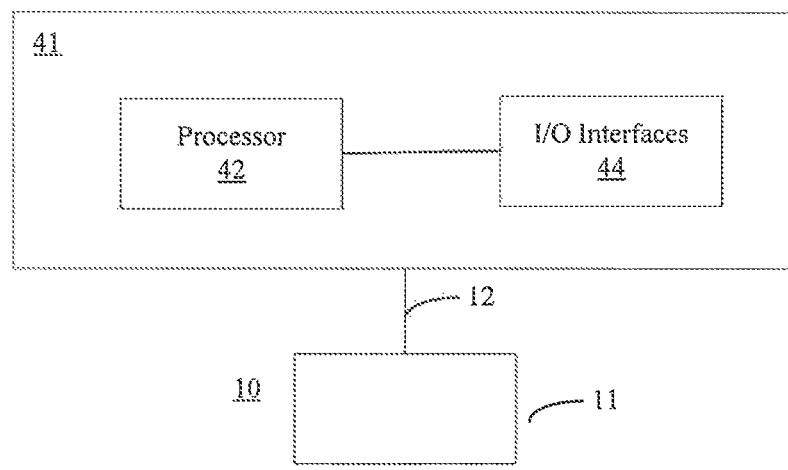
FIG. 4 is a block diagram of a device including a mobile terminal and a pendant connected therewith, according to an exemplary embodiment.

FIG. 4 illustrates a block diagram of a device 40, according to an exemplary embodiment. Referring to FIG. 4, the device 40 includes a mobile terminal 41 and the pendant 10 as described above in connection with FIGS. 1 and 2.

In exemplary embodiments, the mobile terminal 41 includes a processor 42 configured to execute program instructions to perform wireless communications, and one or more data I/O interfaces 44, such as an audio I/O interface, a universal serial bus (USB) interface, a firewire (IEEE 1394) interface, or a power interface. The mobile terminal 41 is connected with the pendant body 11 through the pendant cord 12.

Figure 5:
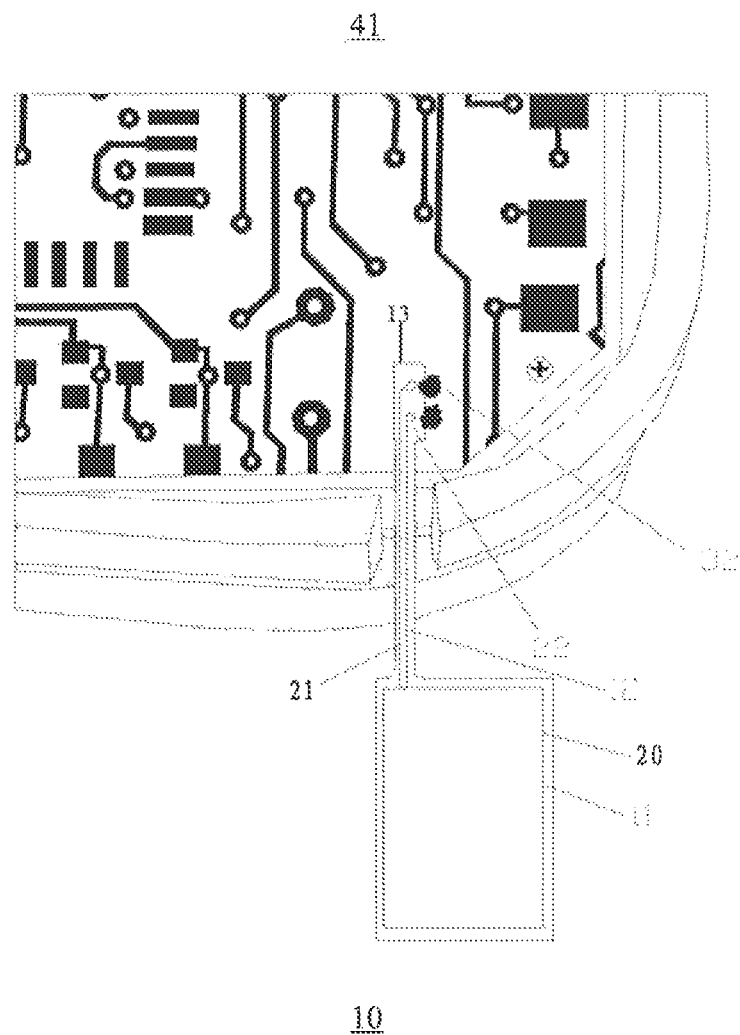
FIG. 5 is a schematic diagram showing a connection between the mobile terminal and the pendant in the device (FIG. 4), according to an exemplary embodiment.

FIG. 5 is a schematic diagram showing a connection between the mobile terminal 41 and the pendant 10 (FIG. 4), according to an exemplary embodiment. For illustrative purposes, only a corner of the mobile terminal 41 is shown in FIG. 5. Referring to FIG. 5, antenna contacts 32 in the second connecting component (not shown) of the mobile terminal 41 will be in contact with the connecting contacts 22 in the first connecting component 13 of the pendant 10, when the first and second connecting components are connected with each other.

In exemplary embodiments, to facilitate wiring in the mobile terminal 41 and the connection with the first connecting component 13 in the pendant 10, the second connecting component is disposed in any one of, e.g., four, corners of the mobile terminal 41, and the antenna contacts 32 in the second connecting component are disposed in a corner of a circuit board corresponding to the position of the second connecting component. In the illustrated embodiment, the second connecting component is disposed in the lower right corner of the mobile terminal 41 and, accordingly, the antenna contacts 32 in the second connecting component are disposed in the lower right corner of the circuit board, as viewed in FIG. 5.

In the above illustrated embodiments, the antenna 20 is built in the pendant body 11 of the pendant 10, such that when the pendant 10 is connected to the second connecting component of the terminal 41 through the first connecting component 13, the connecting contacts 22 in the first connecting component 13 are in contact with the antenna contacts 32 in the second connecting component, which implements the connection between the antenna 20 built in the pendant body 11 and the mobile terminal 41. Thus, due to the built-in arrangement in the pendant 10 that is separated from the mobile terminal 41, the antenna 20 is disposed outside the mobile terminal 41, which saves space in the mobile terminal 41.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A pendant for use with a mobile terminal, comprising:
   a pendant body containing an antenna;
   a pendant cord connected with the pendant body, the pendant cord enclosing a cable connected to the antenna for transmitting and receiving radio frequency signals; and
   a first connecting component for connecting to a second connecting component in the mobile terminal, the first connecting component being a port connecting with the antenna through the cable and corresponding to a data input/output interface of the mobile terminal, the second connecting component being disposed in a corner of the mobile terminal, and an antenna contact in the second connecting component being disposed in a corner of a circuit board corresponding to a position of the second connecting component,
   wherein a connecting contact is disposed in the first connecting component and located at an end of the cable remote from the pendant body for contact with the antenna contact in the mobile terminal, to connect the antenna contained in the pendant body with the mobile terminal; and
   the data input/output interface of the mobile terminal is used to provide the antenna contact.

2. The pendant according to claim 1, wherein:
   the first connecting component is configured to non-detachably connect to the second connecting component, and
   the connecting contact is connected to the antenna contact in the second connecting component through soldering.

3. The pendant according to claim 1, wherein:
   the first connecting component is configured to detachably connect to the second connecting component, and
   the connecting contact is connected with the antenna contact in the second connecting component when the first connecting component is connected with the second connecting component.

4. The pendant according to claim 3, wherein the first connecting component is detachably connectable to the second connecting component through one of a snap-fit connection, a threaded connection or a plug-in connection.

5. The pendant according to claim 1, wherein the data input/output interface is an audio input/output interface, a universal serial bus (USB) interface, a firewire IEEE 1394 interface, or a power interface.

6. The pendant according to claim 1, wherein the antenna is a near field communication (NFC) antenna.

7. The pendant according to claim 6, wherein the NFC antenna is arranged in the pendant body in a manner of homocentric squares.

8. A device, comprising:
   a mobile terminal; and
   a pendant connected to the mobile terminal, wherein the pendant includes:
   a pendant body containing an antenna;
   a pendant cord enclosing a cable connected to the antenna for transmitting and receiving radio frequency signals; and
   a first connecting component for connecting to a second connecting component in the mobile terminal, the first connecting component being a port connecting with the antenna through the cable and corresponding to a data input/output interface of the mobile terminal, the second connecting component being disposed in a corner of the mobile terminal, and an antenna contact in the second connecting component being disposed in a corner of a circuit board corresponding to a position of the second connecting component,
   wherein a connecting contact is disposed in the first connecting component and located at an end of the cable remote from the pendant body for contact with the antenna contact in the mobile terminal, to connect the antenna contained in the pendant body with the mobile terminal; and
   the data input/output interface of the mobile terminal is used to provide the antenna contact.

* * * * *